United States Patent

[11] 3,569,735

[72] Inventor Wendell E. Lavender
Ridgefield, Conn.

[21] Appl. No. 762,046
[22] Filed Sept. 24, 1968
[45] Patented Mar. 9, 1971
[73] Assignee The United States of America as represented by the Secretary of the Army

[54] CONSTANT AMPLITUDE SAWTOOTH GENERATOR

4 Claims, 1 Drawing Fig.

[52] U.S. Cl. .......... 307/228, 307/264, 328/184, 328/185
[51] Int. Cl. .......... H03k 4/50
[50] Field of Search .......... 307/228, 264; 328/181, 184, 185

[56] References Cited

UNITED STATES PATENTS

| | | | |
|---|---|---|---|
| 2,597,322 | 5/1952 | Higinbothom .......... | 328/184X |
| 2,998,532 | 8/1961 | Smeltzer .......... | 328/184X |
| 3,191,066 | 6/1965 | Standenmayer .......... | 307/228 |
| 3,364,366 | 1/1968 | Dryden .......... | 307/228X |

*Primary Examiner*—Donald D. Forrer
*Assistant Examiner*—R. C. Woodbridge
*Attorneys*—Harry M. Saragovitz, Edward J. Kelly, Herbert Berl and Jess J. Smith, Jr.

ABSTRACT: This invention relates to a constant amplitude sawtooth generator. The circuit of the generator comprises a charging capacitor that is discharged through a transistor when an input pulse is applied to the base of the transistor. The sawtooth is linearized by the use of a bootstrap circuit comprising two transistors. A fourth transistor in conjunction with a zener diode is used to sample and control the peak output of the generator. If the output of the generator exceeds the breakdown voltage of the zener diode, the fourth transistor will conduct and lower the charging voltage of the charging capacitor.

PATENTED MAR 9 1971 3,569,735
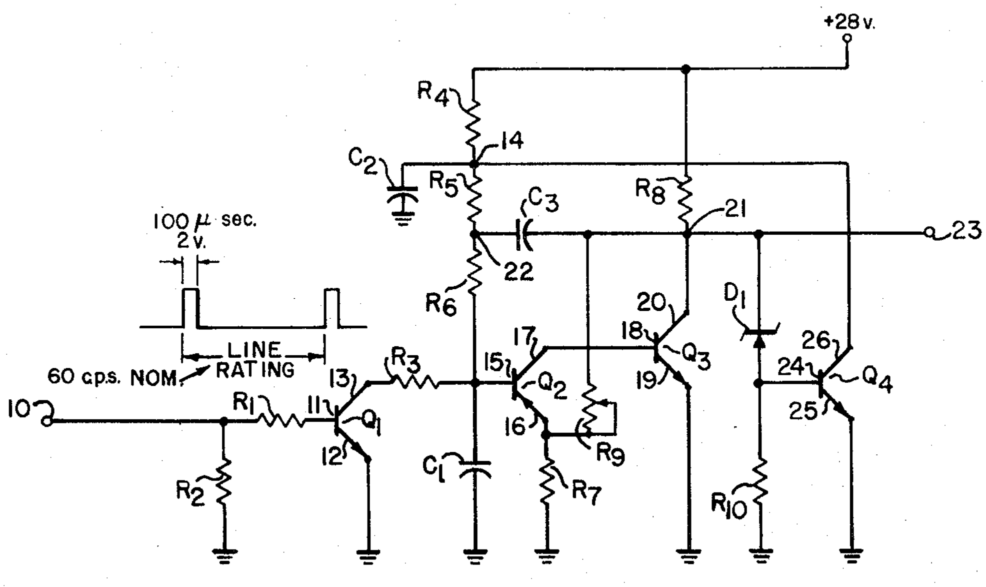
INVENTOR,
WENDELL E. LAVENDER.
BY: Jess Joseph Smith Jr. Agent
Harry M. Saragovitz,
Edward J. Kelly & 3/
Herbert Berl
ATTORNEYS.

CONSTANT AMPLITUDE SAWTOOTH GENERATOR

BACKGROUND OF THE INVENTION

The instant invention relates broadly to the field of wave generation, and more particularly to the field of sawtooth wave generators. The particular circuit herein relates to a sawtooth generator of the type having an intermittently charged and discharged capacitor, a bootstrap amplifier, and an output sample by a Zener diode arrangement in such a manner as to maintain a constant amplitude.

Various sawtooth generators are found in the prior art; however, they generally do not employ a constant amplitude output. Further, when the constant amplitude output is required for various reasons, it is generally accomplished through more complicated AGC circuitry.

Recent work has been done on the Chinese Ideographic Composing Machine, essentially a chinese typewriter employing 30 keys with a capability of selecting up to 10,000 characters. In the operation of this device it is essential to employ a constant amplitude sawtooth voltage which is locked to line frequency; consequently, the instant invention was developed to overcome varying input frequencies caused by line frequency shift.

SUMMARY OF THE INVENTION

It is the general purpose of the instant invention to produce a constant amplitude sawtooth generator. A further object is to produce a constant amplitude sawtooth generator with novel output sampling means to vary the voltage of a charging capacitor. A still further object of the instant invention is to provide a constant amplitude generator that provides a linear sawtooth output and yet is inexpensive and easily constructed. The disclosed device is capable of use with a mobile power supply with a line frequency varying as much as ± 10 percent. Under such conditions, the conventional sawtooth generator would vary in amplitude proportional to frequency. It is the purpose of the disclosed circuit to keep the sawtooth amplitude constant with frequency changes. Further, the disclosed constant amplitude sawtooth generator may be employed in various scanning devices.

BRIEF DESCRIPTION OF THE DRAWING

The exact nature of this invention as well as other objects and advantages thereof will be readily apparent from consideration of the following specification relating to the single FIGURE in which the circuit of the preferred embodiment is shown.

DESCRIPTION OF THE PREFERRED EMBODIMENT

Referring now to the drawing, there is shown the linear sawtooth generator having a constant amplitude output voltage. A source of pulses is applied to terminal 10 that is connected to base 11 of switching transistor $Q_1$ through resistor $R_1$ and to grounded resistor $R_2$. Transistor $Q_1$ has its emitter 12 connected to ground and collector 13 connected to one side of charging capacitor $C_1$ through resistor $R_3$. Capacitor $C_1$ is connected to a source of positive potential through dropping resistors $R_4$, $R_5$, and $R_6$ and to ground or a reference potential. Connected to junction 14 is a grounded bypass capacitor $C_2$. Capacitor $C_1$ is further connected to a bootstrap amplifier arrangement comprising transistors $Q_2$ and $Q_3$. Base 15 of transistor $Q_2$ is connected to one side of capacitor $C_1$ while emitter 15 is connected to ground through resistor $R_7$. Collector 17 of the transistor is connected to the base of $Q_3$ whose emitter 19 is grounded. Collector 20 of transistor $Q_3$ is connected to the source of potential through junction 21 and load resistor $R_8$ and to the emitter 16 of transistor $Q_2$ by means of linearizing potentiometer $R_9$. Collector 20 is further connected to terminal 22 through bootstrap capacitor $C_3$. Output 23 is likewise connected to the collector 20 of transistor $Q_3$ through terminal 21. The output of the generator is sampled by Zener diode $D_1$ that is connected to the base 24 of transistor $Q_4$. Base 24 is connected through resistor $R_{10}$ to ground potential and to the anode of diode $D_1$. Transistor $Q_4$ has its emitter 25 grounded and collector 26 connected to junction 14.

The values of the various components as employed in an actual model are:

| | | |
|---|---|---|
| $R_1$ | | 3.9K |
| $R_2$ | | 1K |
| $R_3$ | | 470 |
| $R_4$ | | 8.2K |
| $R_5$ | | 5.6K |
| $R_6$ | | 6.8K |
| $R_7$ | | 2.7K |
| $R_8$ | | 4.7K |
| $R_9$ | | [1] 500Ω |
| $R_{10}$ | | 10K |
| $Q_1$ | | 2N2270 |
| $Q_2$ | | 2N526 |
| $Q_3$ | | 2N2270 |
| $Q_4$ | | 2N2270 |
| $C_1$ | uf | 2 |
| $C_2$ | uf | 100 |
| $C_3$ | uf | 20 |
| $D_1$ | | 1N752 |

[1] Potentiometer.

Initially capacitor $C_1$ charges until a signal pulse is applied to the base of transistor $Q_1$ through which capacitor $C_1$ discharges. As capacitor $C_1$ charges, transistors $Q_2$ and $Q_3$ amplify and linearize the sawtooth. Potentiometer $R_9$ adjusts the gain of the bootstrap amplifier to slightly greater than unity to make up for circuit losses. Transistor $Q_4$ is connected with Zener diode $D_1$ to form the constant amplitude control circuit. Diode $D_1$ samples the peak DC output of the sawtooth and if such output exceeds the breakdown voltage of the Zener diode $D_1$, transistor $Q_4$ will conduct lowering its collector 26 voltage. By lowering the collector 26 voltage, the charging voltage of capacitor $C_1$ is also lowered giving a smaller amplitude sawtooth. This smaller sawtooth is also present at the collector 20 of transistor $Q_3$ thereby giving closed loop control.

It should be understood, of course, that the foregoing disclosure relates to only a preferred embodiment of the invention and that numerous modifications or alterations may be made therein without departing from the spirit and scope of the invention as set forth in the appended claims.

I claim:

1. A constant amplitude sawtooth generator comprising:
   - a charging-discharging circuit producing a substantially sawtooth waveform;
   - a linear amplifying means including a pair of grounded emitter transistors, each having a base, emitter, and collector, connected to said charging-discharging circuit, and a potentiometer connected from the emitter of one of said pair of transistors to the collector of the other of said pair of transistors for varying the gain of said amplifying means; and
   - sampling means connected to said amplifying means and said charging-discharging circuit for maintaining said waveform at a constant output amplitude.

2. A constant amplitude sawtooth generator according to claim 1 wherein said sampling means comprises:
   - a grounded emitter transistor switch; and
   - a Zener diode connected to said amplifying means and said transistor switch for decreasing the potential source to said charging-discharging circuit.

3. A constant amplitude sawtooth generator according to claim 1 wherein said charging-discharging circuit comprises:
   - a capacitor;
   - a source of positive potential to charge said capacitor;
   - a first transistor having a base, emitter, and collector; and a pulse source, connected to the base of said first transistor and to said capacitor through the collector of said first transistor, for discharging said capacitor upon the application of said pulse source.

4. A constant amplitude sawtooth generator comprising:

a charging-discharging circuit having a capacitor;

a source of positive potential to charge said capacitor;

a first transistor having a base, emitter, and collector;

a pulse source, connected to the base of said first transistor and to said capacitor through the collector of said first transistor, for discharging said capacitor upon the application of said pulse source;

said charging-discharging circuit thereby producing a substantially sawtooth waveform;

amplifying means comprising a second and third transistor, each having a base, emitter, and collector, connected to said capacitor;

a potentiometer connected from the emitter of said second transistor to the collector of said third transistor for varying the gain of said amplifying means;

said amplifying means linearly amplifying said waveform from said charging-discharging circuit; and sampling means comprising a fourth transistor having a grounded emitter, and a Zener diode, said Zener diode being connected to the collector of said third transistor and the base of said fourth transistor for decreasing the potential source of said charging-discharging circuit and thereby maintaining said waveform at a constant output amplitude.